United States Patent [19]
Getz

[11] Patent Number: 5,843,597
[45] Date of Patent: Dec. 1, 1998

[54] RIBBED GASKET FOR MINIATURE GALVANIC CELL

[75] Inventor: Rose A. Getz, Westlake, Ohio

[73] Assignee: Eveready Battery Company, Inc., St. Louis, Mo.

[21] Appl. No.: 980,508

[22] Filed: Dec. 1, 1997

[51] Int. Cl.⁶ ........................................................ H01M 2/08
[52] U.S. Cl. .............................................. 429/174; 429/185
[58] Field of Search .................................... 429/171, 172, 429/174, 185, 162, 163, 27, 164

[56] References Cited

U.S. PATENT DOCUMENTS

| | | | |
|---|---|---|---|
| 3,223,555 | 12/1965 | Solomon et al. | 429/174 X |
| 4,064,329 | 12/1977 | Naylor | 429/174 |
| 4,343,869 | 8/1982 | Oltman et al. | 429/162 X |
| 4,791,034 | 12/1988 | Dopp | 429/174 X |
| 5,576,117 | 11/1996 | Morita et al. | 429/172 X |
| 5,582,932 | 12/1996 | Oltman et al. | 429/171 X |

FOREIGN PATENT DOCUMENTS

| | | |
|---|---|---|
| 4-017255 A | 1/1992 | Japan . |
| 8-124545 A | 5/1996 | Japan . |
| 9-199187 A | 7/1997 | Japan . |

*Primary Examiner*—Anthony Skapars
*Attorney, Agent, or Firm*—Robert W. Welsh

[57] ABSTRACT

A miniature type of galvanic cell employing a novel ribbed gasket that has a rigid rib segment that will reduce any bowing of the central area of a flat electrode, such as a positive electrode of an air depolarized cell. A process is disclosed for producing a novel ribbed gasket having a rigid rib segment and assembling the novel ribbed gasket in a galvanic cell, such as an air depolarized cell.

13 Claims, 5 Drawing Sheets

5,843,597

RIBBED GASKET FOR MINIATURE GALVANIC CELL

FIELD OF THE INVENTION

This invention relates to a miniature type galvanic cell employing a novel gasket in which, upon compression of the gasket between an edge opening of the can of the cell and a flat electrode of the cell, the ribbed portion of the gasket will provide restraining means to the central area of the flat electrode and thereby reduce any bowing at the central area of the electrode. The invention also relates to a process for assembling the novel ribbed gasket into a galvanic cell.

BACKGROUND OF THE INVENTION

The miniaturization of electronic devices has created a demand for small but powerful electrochemical cells. Cells that utilize an alkaline electrolyte are known to provide high energy density per unit volume and are therefore well suited for applications in miniature electronic devices such as cameras, hearing aids, watches and calculators. However, alkaline electrolytes, such as aqueous potassium hydroxide and sodium hydroxide solutions, have an affinity for wetting metal surfaces and are know to creep through the sealed metal interface of an electrochemical cell. Leakage in this manner can deplete the electrolyte solution from the cell and can also cause a corrosive deposit on the surface of the cell that detracts from the cell's appearance and marketability. These corrosive salts may also damage the device in which the cell is housed. Typical cell systems where this problem is encountered include silver oxide-zinc cells, nickel-cadmium cells, air depolarized cells, and alkaline manganese dioxide cells.

In the prior art it has been a conventional practice to incorporate insulating gaskets between the cell cup and can so as to provide a seal for the cell. Generally, the gasket must be made of a material inert to the electrolyte contained in the cell and the cell environment. In addition, it has to be flexible and resistant to cold flow under pressure of the seal and maintain these characteristics so as to insure a proper seal for a long period of storage. Materials such as nylon, polypropylene, ethylene-tetrafluoroethylene copolymer and high density polyethylene have been found to be suitable as gasket materials for most applications. Typically, the insulating gasket is in the form of a "J" shaped configuration in which the extended wall of the can is inserted so that, upon being radially squeezed, the bottom portion of the gasket forms a seal with the bottom portion of the wall of the cup. The gasket generally extends the entire length of the internal wall of the cell. To better insure a good seal, a sealant is generally applied to the gasket, including the internal "U" shaped portion of the gasket so that, upon insertion of the cup into the gasket, the edge of the extended wall of the cup will seat in the sealant, and then upon the application of a radial squeeze, the gasket will be compressed against the extended can wall.

In conventional zinc-air cells of the button-type, the flat positive electrode can be prepared by mixing a catalyst consisting of manganese dioxide, activated carbon and electroconducting acetylene black with further addition of polytetrafluoroethylene (PTFE). The mix is then applied to a metallic screen and then dried. In the assembling of the air electrode into the housing of the cell, a conventional type of insulating "J" shaped gasket having a horizontal base is compressed against the peripheral area of the air electrode. Since the screen of the air electrode is stiffer than the positive electrode mix, the central area of the air electrode bows instead of yielding. The bowing of the air electrode is detrimental to air cell performance because it reduces the internal volume available for the active components and it contributes to delamination of the air electrode.

U.S. Pat. No. 5,576,117 discloses a flat-type cell comprising cup shaped positive and negative electrode cases, each having a cylindrical part, with the negative electrode case being placed inside the positive electrode case with their cylindrical parts facing each other and with a gasket in between, wherein the cylindrical part of the negative electrode case has its open edge folded outwardly to form a U-shaped section and its cylindrical part expanded outwardly.

It is an object of the present invention to provide a miniature galvanic cell structure that employs a novel ribbed insulating gasket that is effective to decrease any bowing encountered in the flat positive electrode component of the cell during assembly.

It is another object of the present invention to provide a novel ribbed gasket for a miniature galvanic cell that is easy to make, cost effective to produce and easy to assemble in the cell.

It is another object of the present invention to provide a novel ribbed gasket for use in miniature galvanic cells that will enable the cell capacity to be increased by providing maximum space for the active negative electrode component when the bowing of the positive electrode member is decreased through the use of the novel ribbed gasket of this invention.

It is another object of the present invention to provide a process for preparing a novel ribbed gasket and assembling the gasket along with the conventional components of a cell into a two-part conductive housing to provide a galvanic cell, such as a zinc-air button-type cell using a flat positive electrode.

The foregoing and additional objects of the present invention will become more fully apparent from the following description and accompanied drawings.

DESCRIPTION OF THE INVENTION

One aspect of this invention is a galvanic cell having a first electrode with a peripheral area and a central area, a second electrode of opposite polarity, a separator between the electrodes and an electrolyte, all contained within a two-part conductive housing, one part of which is a can which is electrically connected to the first electrode and the other part of which is a cup which is electrically connected to the second electrode. Between the can and the cup is an insulating ribbed gasket having a base member with an outer wall spaced apart from an inner wall, thereby defining a U-shaped groove; the gasket also has at least one rigid rib extending from one segment of the base at the inner wall of the gasket across to an opposing segment. The edge of the open end of the cup is disposed within and compressed into the gasket groove, the base of the gasket is compressed against the peripheral area of the first electrode and the gasket rib supports the central area of the first electrode to reduce any bowing at the central area.

Another aspect of this invention is a process of assembling a first electrode, a second electrode and an electrolyte of a cell into a two-part conductive housing in which one part is a cup and the other part is a can, including the steps:

a) preparing a conductive cup having a peripheral wall;

b) preparing a conductive can having a peripheral wall and placing a first electrode within the can;

c) preparing an insulating ribbed gasket with a base member having an inner upstanding wall spaced-apart from an outer upstanding wall thereby defining a U-shaped groove, the base member also having a first segment at the inner wall, a second segment at the inner wall opposing the first segment and at least one insulating rib extending inwardly from the first segment to the second segment;

d) placing the edge of the wall of the cup within the groove of the gasket and placing the second electrode and electrolyte within the cup;

e) assembling the cup of step d) within the can of step b) with the edge of the peripheral wall of the cup compressed against the gasket base and the gasket base compressed against the peripheral area of the first electrode, and with the rib portion of the gasket providing a restraining force on the central area of the first electrode, thereby effectively reducing any bowing of the first electrode at its central area; and f) compressing the edge of the can into the outer wall of the gasket to effectively seal the can to the cup via the gasket and thereby electrically insulate the cup from the can.

As used herein, the term "opposing segment" shall mean any segment on the inner wall of the base member of the gasket, such as (1) a second segment directly opposite the first second segment; (2) a second segment disposed off-set from the central axis of the gasket; or (3) any second segment on the inner wall surface of the base member that is different from the first segment. The insulating ribbed member of the gasket can have a single rib disposed through the central axis or off-set from the central axis of the base member of the gasket, two or more ribs disposed through the central axis of the base member of the gasket and spaced apart at equal and/or unequal angle intervals, and/or two or more ribs disposed between segments that are off-set from the central axis of the base member of the gasket. The ribbed portion of the gasket is preferably molded with the remaining portion to produce a unitary gasket structure. In another embodiment of the invention, the ribbed portion of the gasket could be a separate component of the gasket and be disposed under the base of the gasket or secured to the bottom inward portion of the inner wall of the base member of the gasket. The primary function of the ribbed portion of the gasket is to provide a restraining force against the flat positive electrode so that the bowing generally encountered during the assembly of the cell can be reduced. Since the ribbed portion of the gasket is an insulating member, the area of the rib covering the positive electrode has to be sufficiently small so that it will not effectively decrease the operating capacity of the cell. The rib of the gasket only has to be rigid to a degree that it restrains and reduces the bowing at the central area of a flat electrode better than the bowing of an identically flat electrode without the use of the ribbed portion.

The gasket of this invention is made of a material selected with consideration given to its stability in the presence of the electrolyte, its resiliency, and its resistance to cold flow. Suitable polymeric materials are selected from the group consisting of nylon, polytetrafluoroethylene, fluorinated ethylene-propylene, chlorotrifluoroethylene, perfluoroalkoxy polymer, polyvinyls, polyethylene, polypropylene, polystyrene and the like. Other suitable materials would be recognizable by one skilled in the art. In some applications, additional precautions can be used in conjunction with the ribbed gasket of this invention to provide a more effective seal, such as coating selected areas of the gasket surfaces with a sealing agent such as a fatty polyamide resin or asphalt.

In conventional types of J-shaped gaskets having a horizontal base, the base of the gasket is generally compressed onto a flat disk-shaped positive electrode at its peripheral area. In one embodiment of the invention, the positive electrode of a zinc air cell is usually a thin flexible air electrode containing a screen that is stiffer than the positive electrode mix. When the electrode is compressed at its peripheral area by the edge of the outer wall of the cup via a gasket, the electrode mix is compressed and extruded inward. Since the screen is stiffer than the mix, it bows instead of yielding. Electrode bowing has a significant impact on air cell performance. It has been observed that the discharging zinc negative electrode is generally unable to reverse the bow. As the negative electrode discharges, it discharges against the air electrode first. This creates a hard layer of zinc oxide that will not move with the discharge of the remaining negative electrode. A portion of the void volume is therefore not available, causing the cell to shut down early and thereby result in lower capacity.

In order to reduce bowing of a positive electrode in a miniature galvanic cell, the ribbed gasket of the present invention is provided with a ribbed central portion that will restrain the central area of the flat positive electrode and thereby reduce any bowing at the central area of the positive electrode.

Preferably, when using the ribbed design of the gasket of this invention, the ribbed portion has at least two ribs disposed at right angles. Also preferably, the ribbed portion should be of a unitary construction with the remaining portion of the gasket as could be produced by conventional molding techniques.

Typical cell systems in which this invention can be used are alkaline manganese dioxide cells, air depolarized cells, nickel-cadmium cells and silver oxide-zinc cells.

The cup could be a triclad cup made of nickel, stainless steel and copper.

The can should be made of a conductive material that will not corrode or otherwise deteriorate when in contact with the materials of the cell. The can for the cell could be made of stainless steel, iron, nickel, nickel-plated steel, or some other conductive materials.

BRIEF DESCRIPTION OF THE DRAWINGS

The present invention will become apparent from the following description thereof when considered together with the accompanying drawings, which are set forth as being exemplary of embodiments of the present invention and are not intended, in any way, to be limitative thereof and wherein.

DETAILED DESCRIPTION OF THE DRAWINGS

Figure 10:
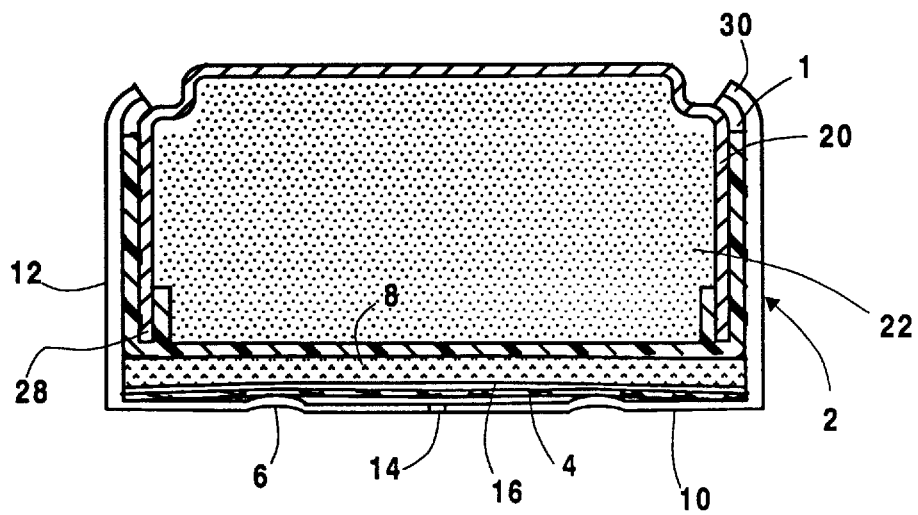
FIG. 10 is a cross-sectional view of the cell of FIG. 7, inverted.
Figure 11:
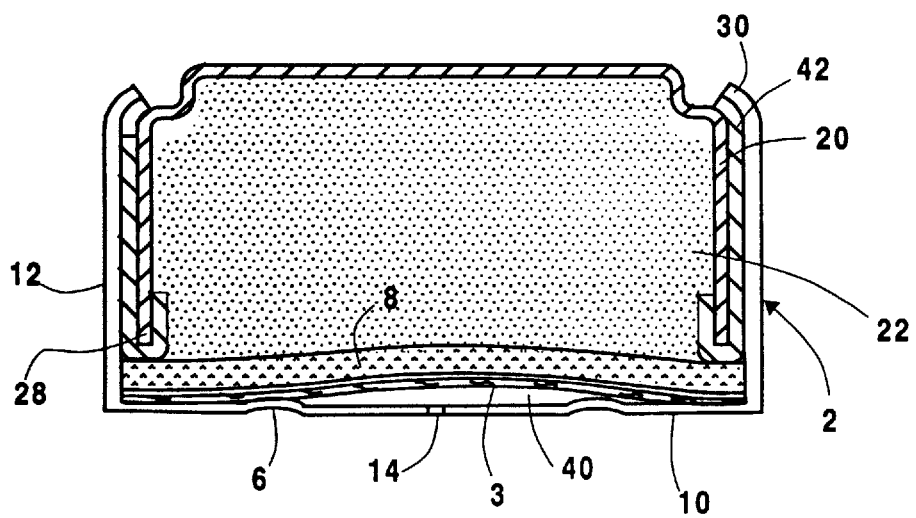
FIG. 11 is a cross-sectional view of a zinc-air cell of the prior art.

FIG. 11 shows a zinc-air cell of the prior art (using the components as identified in FIG. 10) that illustrates the bowing 40 of an air electrode 8 at its central area using a conventional gasket 42. As discussed above, electrode bowing is detrimental to air cell performance because it reduces the internal volume available for the active components and it contributes to delamination of the positive electrode.

Figure 1:
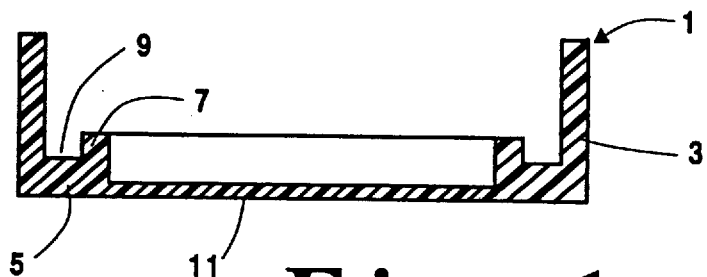
FIG. 1 is a cross-sectional view of a ribbed gasket for use in this invention.
Figure 2:
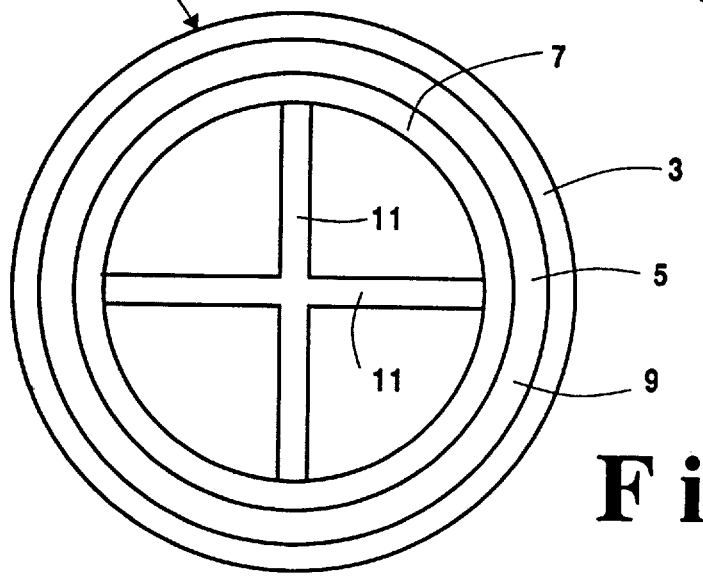
FIG. 2 is a top view of the ribbed gasket shown in FIG. 1.

FIG. 1 and 2 show a ribbed gasket 1 having an outer wall 3, a base 5 and inner wall 7. The outer wall 3 and inner wall 7 form a groove 9. A pair of spaced apart rigid ribs 11 is molded as part of the J-shaped circular contour of the gasket. The rigid ribs are disposed at right angles, thereby the ribs are spaced 90° apart. This type of cross-hatched base design gasket can be used in a metal air cell to restrain the air electrode so that any bowing at the central area of the air electrode can be reduced and thereby provide a greater internal volume for the active components of the cell.

Figure 3:
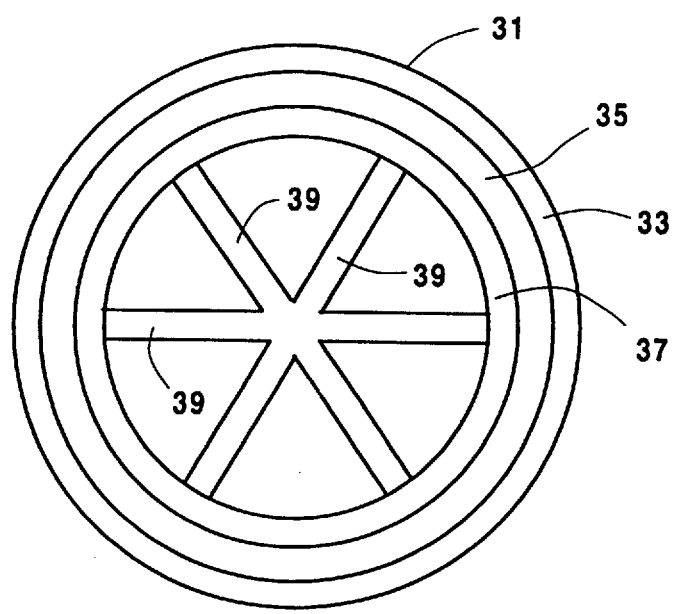
FIG. 3 is a top view of another embodiment of a ribbed gasket for use in this invention.

FIG. 3 shows another embodiment of a ribbed gasket 31 having an outer wall 33, base 3 5 and inner wall 37. Three rigid ribs 39 are shown molded as a part of the J-shaped circular gasket 31. The ribs 39 are spaced apart at 60° intervals.

Figure 4:
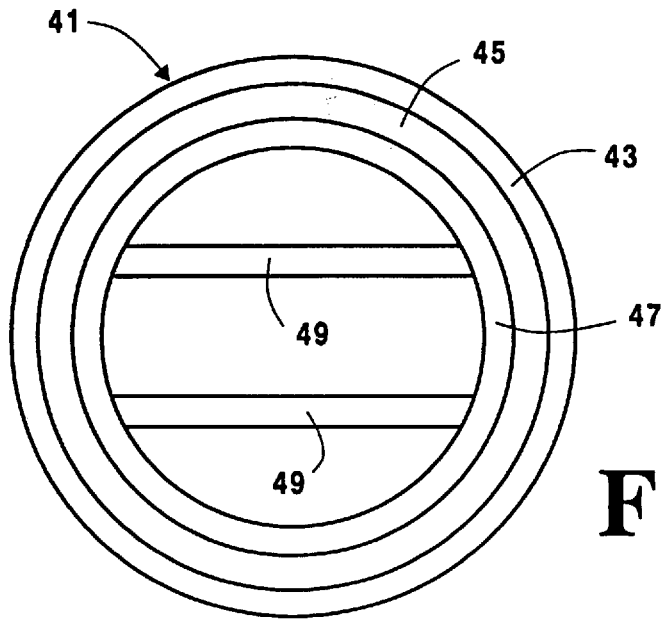
FIG. 4 is a top view of another embodiment of a ribbed gasket for use in this invention.

FIG. 4 shows another embodiment of a ribbed gasket 41 having an outer wall 43, base 45 and inner wall 47. The rigid ribs 49 are shown molded as a part of the J-shaped circular contour. The ribs 49 are disposed so that each rib 49 is aligned parallel to the others.

Figure 5:
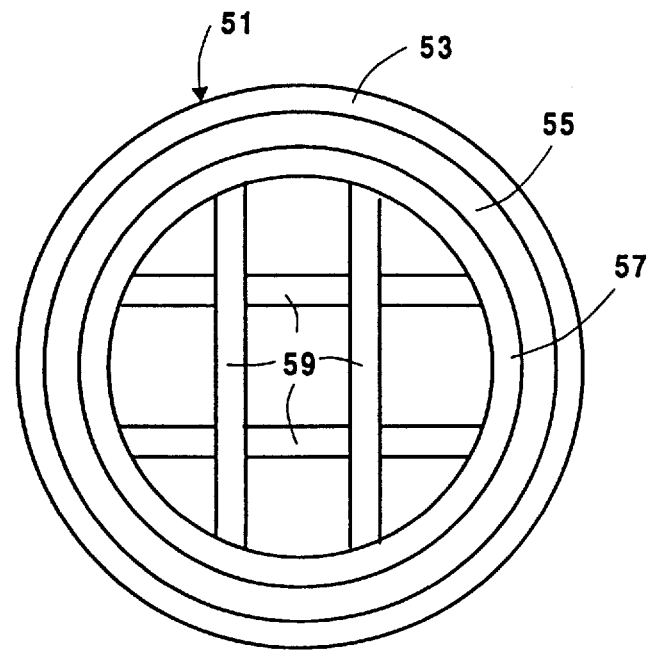
FIG. 5 is a top view of another embodiment of a ribbed gasket for use in this invention.

FIG. 5 shows another embodiment of a ribbed gasket 51 having an outer wall 53, base 55, and inner wall 57. The rigid ribs 59 are shown molded as a part of the J-shaped circular contour. The ribs 59 are disposed so that they do not intersect the central axis of the gasket 51.

In all the embodiments shown in FIGS. 1 to 5, the primary function of the ribbed portion of the gasket is that it provides a restraining force against a flat electrode so that the bowing generally encountered during the assembly of the cell can be reduced for the reasons stated above.

Figure 6:
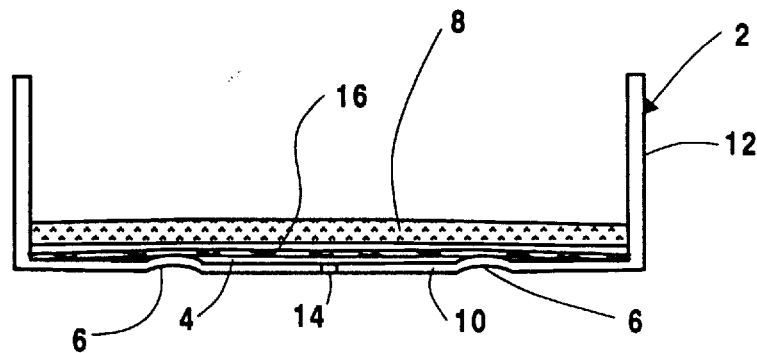
FIG. 6 is a cross-sectional view of an air electrode in a low profile can.

As shown in FIG. 6 the can 2 comprises a base 10 having a peripheral upstanding wall 12 and disposed in base 10 is an opening 14. The can 2 can have patterned internal embossed sections 6 to provide a defined gap for uniform air distribution across the surface of an electrode 8 which is disposed within can 2. The electrode assembly containing the membrane 4, polytetrafluoroethylene layer 16 and electrode 8 containing a metal screen are secured within the can.

Figure 7:
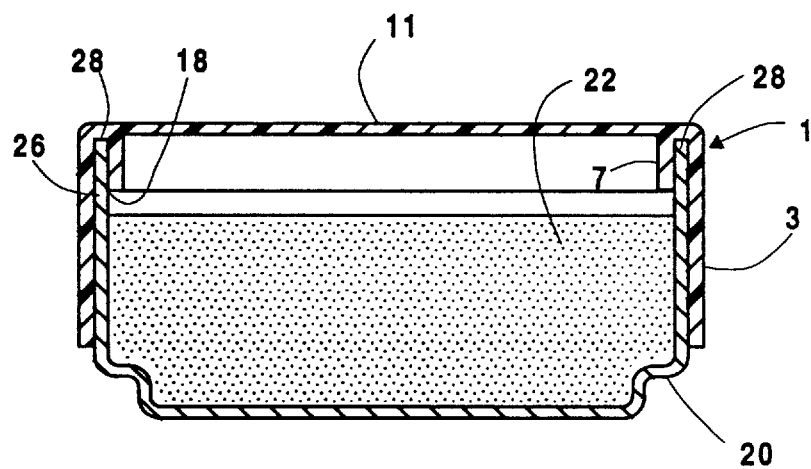
FIG. 7 is a cross-sectional view of a cup containing a negative electrode and secured to the outer wall of the cup in accordance with this invention.

FIG. 7 shows a cup 20 with an negative electrode mixture 22 of zinc powder, placed in the cup 20 and making electronic contact with the cup 20. The mixture 22 can comprise a mixture of zinc particles, electrolyte and organic compounds such as binders which make up the battery's negative electrode 22. The cup 20 can be made from a trilaminate material comprising copper that has been laminated to the bare side of a nickel-clad steel strip. A nickel layer could be used to protect the exterior surface of the steel strip. Other laminated materials from which the cup may be made include: a bilaminate of copper on a stainless steel substrate or a laminate made from more than three layers. The copper layer forms the inside surface of the cup and directly contacts the negative electrode mixture.

As shown in FIG. 7, a gasket 1 of an electrically insulating material as shown in FIG. 1 is disposed onto the outer surface of the peripheral wall 26 of cup 20 and extending over the edge 28 of said wall 26 within groove 18 of gasket 1. A pair of ribs 11 is shown molded as a unitary unit for the gasket 1.

Figure 8:
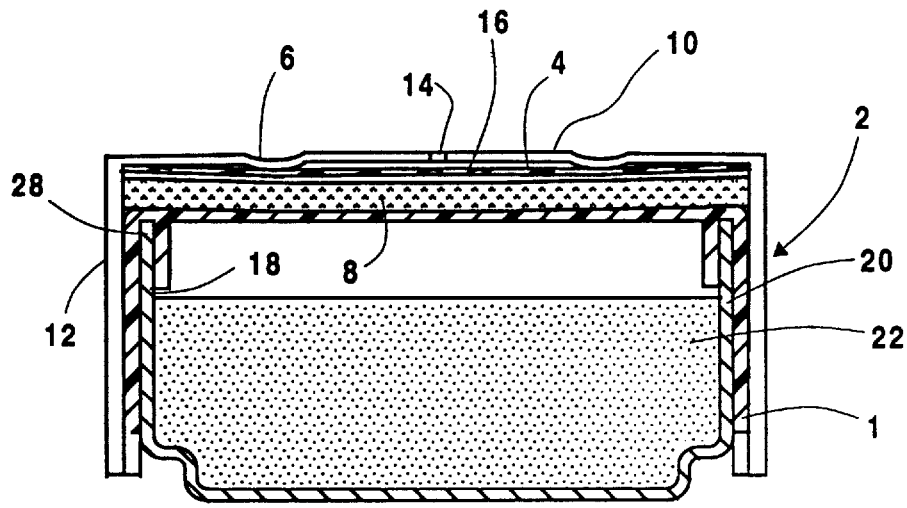
FIG. 8 is a cross-sectional view of the can of FIG. 6 that is inverted and then placed on and over the open end of the cup of FIG. 7 containing the negative electrode and the gasket of this invention.

As shown in FIG. 8, the can 2 along with the inserted electrode assembly of FIG. 6 is inverted over the cup 20 which is preassembled according to this invention and contains negative electrode 22. The edge 28 of the wall of cup 20 is disposed within groove 18 of gasket I and against electrode 8.

Figure 9:
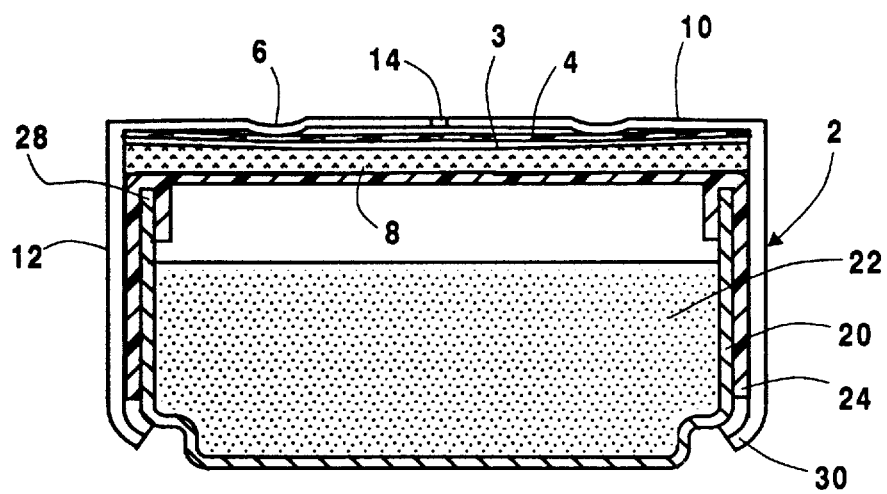
FIG. 9 is a cross-sectional view of the cell of FIG. 8 after the wall of the can was crimped to provide a sealed cell.

As shown in FIG. 9, while the can 2 is inverted, the edge or rim 30 of the can 2 is crimped inwardly. The rim 30 of the can 2 is then compressed against the electrically insulating gasket 1 between the cup 20 and the can 2 thereby forming a seal and an electrical barrier between the can 2 and the cup 20.

The cell of FIG. 9 is shown inverted in FIG. 10.

As shown in FIGS. 6 and 10, hole 14 is punched into the bottom of can 2 to act as an air-entering port. The cell as shown in FIG. 9 and FIG. 10, shows the can 2 is in electrical contact with electrode 8 and the cup 20 is in electrical contact with electrode 22 and thus the terminals of the cell are at opposite ends.

It is to be understood that modifications and changes to the preferred embodiment of the invention herein shown and described can be made without departing from the spirit and scope of the invention.

What is claimed:

1. A galvanic cell comprising:
    a) a first electrode having a peripheral area, a central area and a polarity;
    b) a second electrode of opposite polarity;
    c) a separator between said first electrode and said second electrode;
    d) an electrolyte;
    e) a two-part conductive housing containing said first electrode, said second electrode, said separator and said electrolyte; the first part of said housing being a can having a wall with an edge defining an opening and electrically connected to the first electrode, and the second part of said housing being a cup having a wall with an edge defining an opening and being electrically connected to the second electrode; and
    f) an insulating gasket comprising a base member having an outer wall spaced apart from an inner wall thereby defining a U-shaped groove, the base member further having a first segment at the inner wall, a second segment at the inner wall opposing the first segment and at least one insulating rigid rib extending inwardly from the first segment to the second segment; wherein the edge of the open end of the cup is disposed within and compressed into the groove of said gasket, the base member is compressed against the peripheral area of said first electrode and the rib is a support for the central area of said first electrode and thereby effectively reduces any bowing at the central area.

2. The galvanic cell of claim 1 wherein the base member, outer wall, inner wall and rib are a unitary unit.

3. The galvanic cell of claim 1 wherein the rib is a separate member from the base member, outer wall and inner wall.

4. The galvanic cell of claim 1 wherein said gasket comprises two ribs disposed 90° apart.

5. The galvanic cell of claim 1 wherein said gasket comprises three ribs disposed 60° apart.

6. The galvanic cell of claim 1 wherein said gasket is a circular gasket comprising a plurality of ribs which do not intersect the central axis of said gasket.

7. The galvanic cell of claim 1 wherein said gasket is made of a material selected from the group consisting of nylon, polytetrafluoroethylene, fluorinated ethylene-propylene, chlorotrifluoroethylene, perfluoro-alkoxy polymer, polyvinyls, polyethylene, polypropylene and polystyrene.

8. A galvanic cell of claim 7 wherein said gasket is made of nylon.

9. The galvanic cell of claim 1 wherein said first electrode is the positive electrode and said second electrode is the negative electrode.

10. The galvanic cell of claim 9 wherein the positive electrode is an air electrode.

11. The galvanic cell of claim 10 wherein the negative electrode comprises zinc.

12. The galvanic cell of claim 7 wherein the base member, outer wall, inner wall and rib are a unitary unit.

13. The galvanic cell of claim 12 wherein said gasket comprises two ribs disposed 90° apart.

* * * * *